United States Patent [19]
Reed et al.

[11] Patent Number: 6,052,248
[45] Date of Patent: Apr. 18, 2000

[54] PARITY CHANNEL CODE FOR ENHANCING THE OPERATION OF A REMOD/DEMOD SEQUENCE DETECTOR IN A D=1 SAMPLED AMPLITUDE READ CHANNEL

[75] Inventors: David E. Reed, Westminster; William G. Bliss, Thornton, both of Colo.

[73] Assignee: Cirrus Logic, Inc., Fremont, Calif.

[21] Appl. No.: 09/016,004

[22] Filed: Jan. 30, 1998

[51] Int. Cl.[7] ............................................. G11B 5/09
[52] U.S. Cl. .................................. 360/53; 360/41
[58] Field of Search ........................ 360/53; 714/794, 714/795, 765, 802; 375/262, 341

[56] References Cited

U.S. PATENT DOCUMENTS

| | | | |
|---|---|---|---|
| 5,521,945 | 5/1996 | Knudson . | |
| 5,544,178 | 8/1996 | Zook | 371/43 |
| 5,576,707 | 11/1996 | Zook | 341/58 |
| 5,774,286 | 6/1998 | Shimoda | 360/46 |
| 5,774,470 | 6/1998 | Nishiya et al. | 371/3 |
| 5,844,741 | 12/1998 | Yamakawa et al. | 360/65 |
| 5,926,490 | 7/1999 | Reed et al. | 371/44 |
| 5,938,790 | 8/1999 | Marrow | 714/795 |
| 5,949,831 | 9/1999 | Coker et al. | 375/341 |

OTHER PUBLICATIONS

US application No. 08/681,678, filed Jul. 29, 1996, Reed et al.
US application No. 08/862,493, filed May 23, 1997, Reed et al.
Roger Wood, "Turbo–PRML: A Compromise EPRML Detector," *IEEE Transactions on Magnetics*, vol. 29, No. 6, Nov. 1993. (pp. 4018–4020).
Hideyuki Yamakawa, "SPERD: Simplified Partial Error Response Detection," *IEEE Inter Mag '95*, San Antonio, Texas, Apr. 1995.
Takushi Nishiya, "PERD: Partial Error Response Detection," *IEEE Inter Mag '95*, San Antonio, Texas, Apr. 1995.
Takushi Nishiya and Hideyuki Yamakawa, "PERD: Partial Error Response Detection," *IEEE Transactions on Magnetics*, vol. 31, No. 6, Nov. 1995.
Peter A. McEwen and Jack K. Wolf, "Trellis Codes for (1,k) E2PRM4ML with Squared Distance 18", *IEEE Transactions on Magnetics*, vol. 32, No. 5, Sep. 1996. (pp. 3995–3997).
J. Hagenauer and P. Hoeher, "A Viterbi Algorithm with Soft–Decision Outputs and its Applications", Conference Proceedings, IEEE Globecom, Dallas, TX, Nov., 1989. (pp. 1680–1686).
Bahl et al, "Optimal Decoding of Linear Codes for Minimizing Symbol Error Rate", *IEEE Trans. on Information Theory*, Mar. 1974. (pp. 284–287).

*Primary Examiner*—W. Chris Kim
*Attorney, Agent, or Firm*—Howard H. Sheerin; Dan Shifrin

[57] ABSTRACT

A sampled amplitude read channel is disclosed for disk storage systems employing a run-length limited (RLL) d=1 channel code which compensates for partial erasure, and a parity channel code for enhancing the operation of a remod/demod sequence detector. During a write operation, after encoding the user data into codewords comprising the RLL d=1 constraint, the parity over one interleave of a block of NRZI bits is computed and two parity bits appended to form a parity codeword. For an even number of "1" bits in the block, the parity bits are set to "00". For an odd number of "1" bits in the block, the parity bits are set to "10" if the codeword ends with a "0" bit and to "01" if the codeword ends with a "1" bit, thereby maintaining the RLL d=1 constraint. Thus, a parity codeword will always comprise an even number of "1" bits (even parity). During read back, a parity syndrome is generated over a detected parity codeword; if the parity syndrome indicates the codeword comprises an odd number of "1" bits (odd parity), then the codeword is corrected according to the most likely error made by the remod/demod sequence detector. As a result, the remod/demod sequence detector of the present invention approaches the distance enhanced performance of matching a trellis state machine to the parity constraint, but with significantly less circuitry.

25 Claims, 11 Drawing Sheets

PARITY CHANNEL CODE FOR ENHANCING THE OPERATION OF A REMOD/DEMOD SEQUENCE DETECTOR IN A D=1 SAMPLED AMPLITUDE READ CHANNEL

CROSS REFERENCE TO RELATED APPLICATIONS AND PATENTS

This application is related to other U.S. patent applications, namely application Ser. No. 862,493, U.S Pat. No. 5,926,490, entitled "Sampled Amplitude Read Channel Employing a Remod/Demod Sequence Detector Guided by an Error Syndrome," 08/681,678, U.S. Pat. No. 5,771,127, entitled "A Sampled Amplitude Read Channel Employing Interpolated Timing Recovery and a Remod/Demod Sequence Detector," 08/681,692, U.S. Pat. No. 5,717,395, entitled "A Rate 16/17 ENDEC With Independent High/Low Byte Decoding," and Ser. No. 08/640,351 entitled "Adaptive Equalization and Interpolated Timing Recovery in a Sampled Amplitude Read Channel for Magnetic Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector," U.S. Pat. No. 5,576,904 entitled "Timing Gradient Smoothing Circuit in a Synchronous Read Channel," U.S. Pat. No. 5,585,975 entitled "Equalization for Sample Value Estimation and Sequence Detection in a Sampled Amplitude Read Channel," and U.S. Pat. No. 5,424,881 entitled "Synchronous Read Channel." All of the above-named patent applications and patents are assigned to the same entity, and all are incorporated herein by reference.

FIELD OF INVENTION

The present invention relates to the control of storage systems for digital computers (such as magnetic and optical disk drives), particularly to a d=1 sampled amplitude read channel comprising a remod/demod sequence detector enhanced by a parity channel code.

BACKGROUND OF THE INVENTION

Computer storage systems (such as optical, magnetic, and the like) record digital data onto the surface of a storage medium, which is typically in the form of a rotating magnetic or optical disk, by altering a surface characteristic of the disk. The digital data serves to modulate the operation of a write transducer (write head) which records binary sequences onto the disk in radially concentric or spiral tracks. In magnetic recording systems, for example, the digital data modulates the current in a write coil in order to record a series of magnetic flux transitions onto the surface of a magnetizable disk. And in optical recording systems, for example, the digital data may modulate the intensity of a laser beam in order to record a series of "pits" onto the surface of an optical disk. When reading this recorded data, a read transducer (read head), positioned in close proximity to the rotating disk, detects the alterations on the medium and generates a sequence of corresponding pulses in an analog read signal. These pulses are then detected and decoded by read channel circuitry in order to reproduce the digital sequence.

Detecting and decoding the pulses into a digital sequence can be performed by a simple peak detector in a conventional analog read channel or, as in more recent designs, by a discrete-time sequence detector in a sampled amplitude read channel. Discrete-time sequence detectors are preferred over simple analog pulse detectors because they compensate for intersymbol interference (ISI) and are less susceptible to channel noise. Consequently, discrete-time sequence detectors increase the capacity and reliability of the storage system.

There are several well known discrete-time sequence detection methods including discrete-time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

Unlike conventional peak detection systems, sampled amplitude recording detects digital data by interpreting, at discrete-time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate channel and aliasing noise. After sampling, a digital equalizer equalizes the sample values according to a desired partial response, and a discrete-time sequence detector, such as a Viterbi detector, interprets the equalized sample values in context to determine a most likely sequence for the digital data (i.e., maximum likelihood sequence detection (MLSD)). MLSD takes into account the effect of ISI and channel noise in the detection algorithm, thereby decreasing the probability of a detection error. This increases the effective signal-to-noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, September; 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, November 1991; and Carley et al, "Adaptive Continous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on*

Magnetics, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag'90*.

It is a general perception in the prior art that higher order read channels provide an increase in performance because less equalization is required to match the read signal to the desired partial response, and because higher order read channels tend to perform better at higher data densities. However, the trade-off in higher order read channels is the increase in complexity. For example, a Partial Response Class-IV (PR4) read channel, which has a transfer function of $1-D^2$, can be implemented simply as a pair of two-state sliding threshold detectors (see the above referenced paper entitled "A PRML System for Digital Magnetic Recording") However, a PR4 read channel exhibits a loss in performance due to the amount of equalization required to match the read signal to the PR4 response. An Extended Partial Response Class-IV (EPR4) read channel, which has a transfer function of $(1-D)(1+D)^2$, requires less equalization which results in performance gain over the PR4 read channel, as well as providing a general improvement in bit error rate at higher data densities. However, a full EPR4 detector requires a significantly more complex add-compare-select (ACS) state machine that operates according to an eight-state trellis. Still higher order read channels, such as EEPR4 with a transfer function of $(1-D)(1+D)^3$, provide even better performance at higher data densities but with the complexity increasing on orders of magnitude (e.g., a full EEPR4 trellis requires sixteen-states as shown in FIG. 6).

Another well known technique for enhancing the performance of a discrete-time sequence detector is to encode the recorded data according to a particular channel code, and then to "match" the trellis state machine to the code constraint of the channel code. This technique, referred to trellis coded modulation (TCM), enhances the distance property of the detector by "coding out" certain data sequences. For example, if the data is encoded into codewords having even parity, then a sequence detector with a trellis matched to this constraint will not allow the detection of codewords with odd parity, thereby increasing the distance between valid codewords. This increase in distance increases the effective signal-to-noise ratio without increasing the signal power, thereby allowing an increase in data density while maintaining an arbitrarily low bit error rate. However, matching the trellis state machine to a code constraint requires significantly more circuitry to implement. In the above parity code example, the number of states in the trellis would effectively double so that survivor sequences containing both even and odd parity could be saved until the detector reaches the end of a codeword. This increase in cost and complexity has prevented the wide spread use of trellis coded modulation in sampled amplitude read channels currently on the market.

The above referenced U.S. patent application entitled "Sampled Amplitude Read Channel Employing a Remod/Demod Sequence Detector Guided by an Error Syndrome" discloses a method for obtaining approximately the same distance enhancing performance of a trellis matched to a code constraint, but with a significant reduction in complexity. In that patent application, instead of matching the trellis state machine to a code constraint, the code constraint is used to generate an error syndrome for correcting the estimated binary sequence output by the sequence detector. The location and correction values of an error are determined by remodulating the detected binary sequence into an estimated sample sequence, subtracting the estimated sample sequence from the read signal sample sequence to generate a sample error sequence, and then filtering the sample error sequence with filters matched to minimum distance error events of the sequence detector. In this manner, the error syndrome generated using the code constraint indicates when an error has occurred in the detected binary sequence, and the filtered error sequence indicates the most likely location and correction value for the error. This technique approaches the performance gain provided by matching the trellis to the code constraint, but with a significant reduction in circuitry—etecting the error locations and correction values can be implemented cost effectively using a finite-impulse-response (FIR) filter and a small lookup table.

Although the above referenced patent application discloses the general idea of using an error syndrome to correct errors in the estimated binary sequence rather than match the detector's trellis to the code constraint, it does not suggest how to apply this technique to a system employing a run-length-limited (RLL) d=1 constraint. The RLL d=1 constraint is typically used in magnetic recording system to minimize the non-linear effect of partial erasure at higher data densities by increasing the minimum spacing between consecutive magnetic transitions. This is accomplished by encoding the recorded data according to a code constraint that ensures at least one "0" bit occurs between consecutive "1" bits in NRZI format.

Partial erasure is a non-linear reduction in pulse amplitude due to interference from an adjacent pulse caused by a consecutive magnetic transition. Although an RLL d=1 constraint reduces the deleterious effect of partial erasure, it is not normally employed due to the attendant reduction in code rate—a d=1 code is typically implemented at rate 2/3, whereas a d=0 code is typically implemented at rate 8/9. Instead, the write circuitry is normally used to compensate for partial erasure using a technique known as "write-precomp"—phase delaying the location of consecutive transitions by phase delaying the write clock. However, at higher data densities the effectiveness of write-precomp deteriorates to a point where the RLL d=1 constraint actually provides better performance even though there is a reduction in code rate. In other words, for an arbitrarily low bit error rate, it is possible to achieve higher user data densities with an RLL d=1 constraint as compared to an RLL d=0 constraint using write-precomp.

There is, therefore, a need to improve the performance of a discrete-time sequence detector for RLL d=1 sampled amplitude read channels, thereby achieving an increase in data density while maintaining an arbitrarily low bit error rate. Another aspect of the present invention is to employ a channel code to improve the performance of the sequence detector while avoiding the complexity of matching the detector's trellis state machine to the code constraint.

SUMMARY OF THE INVENTION

A sampled amplitude read channel is disclosed for disk storage systems employing a run-length limited (RLL) d=1 channel code which compensates for partial erasure, and a parity channel code for enhancing the operation of a remod/demod sequence detector. During a write operation, after encoding the user data into codewords comprising the RLL d=1 constraint, the parity over one interleave of a block of NRZI bits is computed and two parity bits appended to form a parity codeword. For an even number of "1" bits in the block, the parity bits are set to "00". For an odd number of "1" bits in the block, the parity bits are set to "10" if the codeword ends with a "0" bit and to "01" if the codeword ends with a "1" bit, thereby maintaining the RLL d=1 constraint. Thus, a parity codeword will always comprise an even number of "1" bits (even parity). During read back, a parity syndrome is generated over a detected parity codeword; if the parity syndrome indicates the codeword comprises an odd number of "1" bits (odd parity), then the codeword is corrected according to the most likely error made by the remod/demod sequence detector. As a result, the remod/demod sequence detector of the present invention approaches the distance enhanced performance of matching a trellis state machine to the parity constraint, but with significantly less circuitry.

In the preferred embodiment, the most likely error is determined by searching for the dominant error event (a bit shift) in the EEPR4 sample error space. An EEPR4 Viterbi sequence detector, matched to the RLL d=1 constraint, detects a preliminary binary sequence which is corrected when the parity syndrome indicates that the EEPR4 sequence detector has made a detection error. The most likely location and value for the error is determined by remodulating the preliminary binary sequence into an estimated sample sequence, subtracting the estimated sample sequence from the read signal sample sequence to generate a sample error sequence, and filtering the sample error sequence with a filter matched to the bit shift error event. The location within the parity codeword where the filter output is maximum corresponds to where the bit shift error event is most likely to have occurred. By evaluating the misdetected data sequence, a correction sequence can be generated and used to correct the codeword. In effect, the EEPR4 remod/demod sequence detector of the present invention approaches the distance enhanced performance of a EEPR4 sequence detector with a trellis state machine matched to the parity constraint, but with significantly less circuitry.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Data Format

Figure 1A:
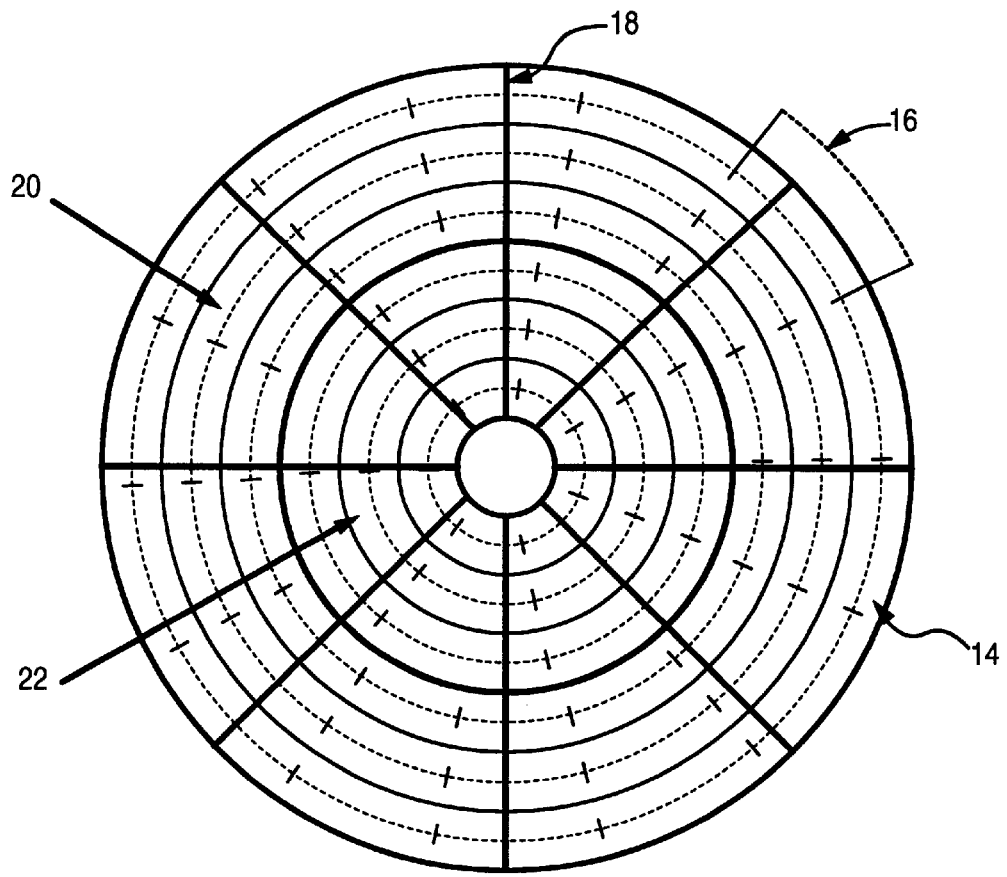
FIG. 1A shows a magnetic disk storage medium comprising a plurality of concentric, zoned data tracks and embedded servo wedges, where the data tracks are partitioned into a plurality of data sectors.

FIG. 1A shows a conventional data format of a magnetic disk storage medium comprising a series of concentric, radially spaced data tracks 14, wherein each data track 14 comprises a plurality of sectors 16 with embedded servo wedges 18. A servo controller (not shown) processes the servo data in the servo wedges 18 and, in response thereto, positions a read/write head over a selected track. Additionally, the servo controller processes servo bursts within the servo wedges 18 to keep the head aligned over a centerline of the selected track while writing and reading data. The servo wedges 18 may be detected by a simple discrete-time pulse detector or by the discrete-time sequence detector of FIG. 2. The format of the servo wedges 18 includes a preamble and a sync mark, similar to the user data sectors 16 described below with reference to FIG. 1B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 1A where the disk is partitioned into an outer zone 20 comprising fourteen data sectors per track, and an inner zone 22 comprising seven data sectors per track. In practice, the disk is actually partitioned into several zones with increasing data rates from the inner to outer diameter zones.

Figure 1B:
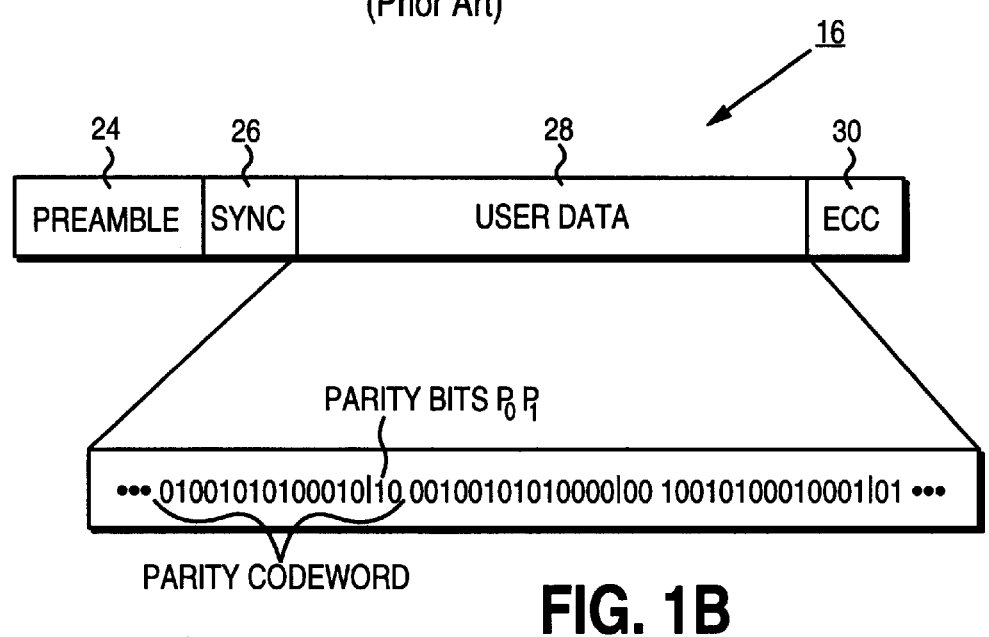
FIG. 1B shows an example format of a data sector comprising a preamble for frequency/phase locking timing recovery, a sync mark for symbol synchronizing the user data, and redundancy symbols of an error correction code (ECC), where the data field is encoded using a RLL d=1 and parity channel code according to one aspect of the present invention.

FIG. 1B shows the format of a data sector 16 comprised of an acquisition preamble 24, a sync mark 26, a user data field 28, and appended ECC bytes 30 for use in detecting and correcting errors in the user data upon readback. Timing recovery 68 of FIG. 2 processes the acquisition preamble 24 to acquire the correct data frequency and phase before reading the user data field 28, and the sync mark 26 demarks the beginning of the user data field 28 for use in symbol synchronizing the user data. In the present invention, the user data 28 are encoded according to a RLL d=1 and parity channel code to provide a distance enhancing improvement over the prior art. Thus, the user data field 28 comprises a plurality of parity codewords each comprising two parity bits $P_0$ and $P_1$ which are set such that the parity over the codeword is always even. For an even number of "1" bits, the parity bits are set to "00". For an odd number of "1" bits, the parity bits are set to "10" if the codeword ends with a "0" bit and to "01" if the codeword ends with a "1" bit, thereby maintaining the RLL d=1 constraint.

Sampled Amplitude Read Channel

Figure 2:
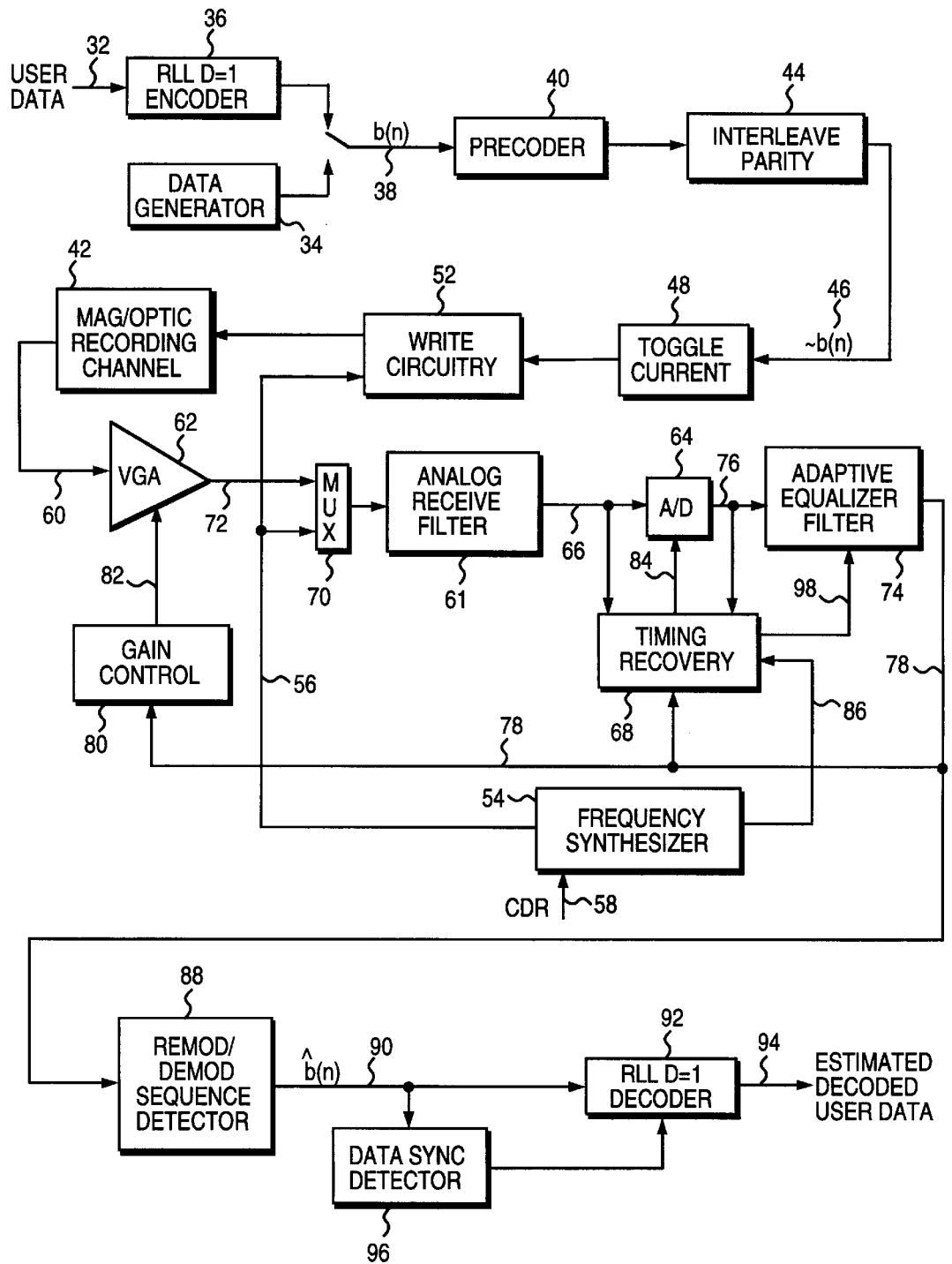
FIG. 2 is a block diagram of the sampled amplitude read channel of the present invention comprising an interleave parity generator and a remod/demod sequence detector.

Referring now to FIG. 2, shown is a block diagram of the sampled amplitude read channel of the present invention. During a write operation, the read channel receives user data over line 32 from the host system. A data generator 34 generates the preamble 24 of FIG. 1B (for example 2T preamble data) written to the disk prior to writing the user data 28. The data generator 34 also generates a sync mark 26 for use in symbol synchronizing to the user data during a read operation. A RLL d=1 encoder 36 encodes the user data 32 according to a run-length limited RLL d=1 constraint to generate an encoded binary sequence b(n) 38. Although the implementation details of the RLL d=1 encoder 36 are not shown, any of the techniques well known in the art of digital recording systems will suffice.

After RLL encoding 36, a precoder 40 precodes the binary sequence b(n) 38 in order to compensate for the transfer function of the recording channel 42 and equalizing filters. An interleave parity generator 44 then computes the parity over a section or block of bits in NRZI space, and appends two NRZI parity bits $P_0$ and $P_1$ to each block to form a parity codeword as described above with reference to FIG. 1B.

The sequence of NRZI bits ~b(n) 46 in the parity code words modulate the write current of the write circuitry 52, thereby modulating the current in the recording head coil (or intensity of a laser beam) at the zone baud rate to record a sequence of transitions onto the disk 42, wherein the transitions represent the recorded data. In NRZI recording, a "1" bit toggles 48 the polarity of the write current to write a transition onto the disk, and a "0" bit writes no transition (i.e., has no affect on the write current). A frequency synthesizer 54 provides a baud rate write clock 56 to the write circuitry 52 and is adjusted by a baud or channel data rate signal (CDR) 58 according to the current zone the recording head is over.

When reading the recorded binary sequence from the media, timing recovery 68 first locks to the write frequency of the zone by selecting, as the input to the read channel, the write clock 56 through a multiplexer 70. Once locked to the write frequency, which is the nominal sampling frequency, the multiplexer 70 selects the signal 72 from the read head as the input to the read channel in order to acquire the acquisition preamble 24 recorded on the disc prior to the recorded user data 28 as shown in FIG. 1B. A variable gain amplifier 62 adjusts the amplitude of the analog read signal 60, and an analog receive filter 61 provides initial equalization toward the desired response as well as attenuating aliasing noise. A sampling device 64 samples the analog read signal 66 from the analog filter 61, and a discrete-time equalizer filter 74 provides further equalization of the sample values 76 toward the desired response. In partial response recording, for example, the desired partial response is often selected from Table 1:

TABLE 1

| Channel | Transfer Function | Dipulse Response |
|---------|-------------------|------------------|
| PR4 | (1–D) (1+D) | 0, 1, 0, –1, 0, 0, 0, . . . |
| EPR4 | (1–D) (1+D)$^2$ | 0, 1, 1, –1, –1, 0, 0, . . . |
| EEPR4 | (1–D) (1+D)$^3$ | 0, 1, 2, 0, –2, –1, 0, . . . |

The discrete equalizer filter 74 may be implemented as a real-time adaptive filter which compensates for parameter variations over the disc radius (i.e., zones), disc angle, and environmental conditions such as temperature drift.

After equalization, the equalized sample values 78 are applied to a decision directed gain control 80 and timing recovery 68 circuit for adjusting the amplitude of the read signal 60 and the frequency and phase of the sampling device 64, respectively. Gain control 80 adjusts the gain of variable gain amplifier 62 over line 82 in order to match the magnitude of the channel's frequency response to the desired partial response, and timing recovery 68 adjusts the Ii frequency of sampling device 64 over line 84 in order to synchronize the equalized samples 78 to the baud rate. Frequency synthesizer 54 provides a course center frequency setting to the timing recovery circuit 68 over line 86 in order to center the timing recovery frequency over temperature, voltage, and process variations.

In the preferred embodiment, the discrete-time equalizer 74 equalizes the 76 sample values into an EEPR4 response. As such, the preferred embodiments for timing recovery 68 and gain control 80 are disclosed in the above references U.S. pat. Nos. 5,359,631 and 5,297,184, respectively. However, an alternative embodiment is to equalize into a PR4 response so that a simple slicer can generate estimated samples for timing recovery and gain control. Thus, the choice of equalization is a design criteria based on the desired performance at a given data density; it is not a limitation of the present invention. For implementation details concerning various alternative embodiments for sample value estimation for timing recovery 68 and gain control 80, see the above referenced U.S. Pat. No. 5,585,975, "Equalization for Sample Value Estimation and Sequence Detection in a Sampled Amplitude Read Channel." For details on the preferred embodiment for an adaptive discrete-time equalizer, see the above referenced co-pending U.S. patent application, "Adaptive Equalization and Interpolated Timing Recovery in a Sampled Amplitude Read Channel for Magnetic Recording." The aforementioned co-pending U.S. patent application also illustrates an alternative embodiment for synchronous-sampling timing recovery 68: sampling the analog read signal asynchronously and interpolating the asynchronous samples to generate the synchronous samples.

The synchronous, equalized samples 78 are ultimately input into a remod/demod sequence detector 88 which detects an estimated binary sequence ^b(n) 90 from the sample values. An RLL d=1 decoder 92 decodes the estimated binary sequence ^b(n) 90 output by the sequence detector 88 into estimated user data 94. A data sync detector 96 detects the sync mark 26 (shown in FIG. 1B) in the data sector 16 in order to frame operation of the RLL d=1 decoder 92. In the absence of errors, the estimated binary sequence ^b(n) 90 matches the recorded binary sequence b(n) 38, and the decoded user data 94 matches the recorded user data 32. A detailed description of the remod/demod sequence detector 88, including the performance enhancing aspect of the parity channel code, is provided below.

Trellis Sequence Detector

The sampled amplitude read channel of the present invention employs partial response (PR) equalization and maximum likelihood (ML) sequence detection (e.g., Viterbi sequence detection). To understand the sequence detection operation, consider the trellis sequence detector for a partial response class-IV (PR4) read channel. The transfer function for this channel is represented by the polynomial $(1-D^2)$ where D is a delay operator referring to the channel or baud rate. With the input symbols taking on the values +1 or –1, the output channel samples take on values in the set {+2, 0,–2}. A trellis sequence detector, such as a Viterbi detector for PR4, operates by evaluating the channel samples in context to determine a most likely estimated data sequence associated with the samples.

Figure 3A:
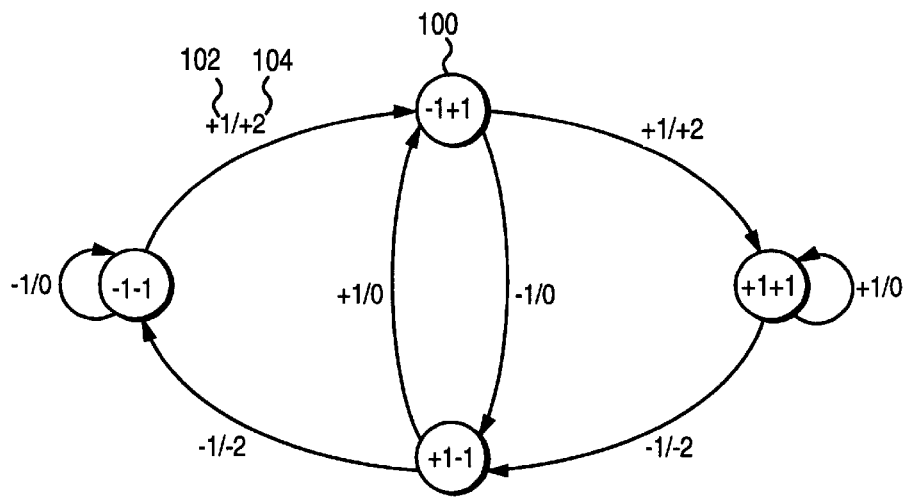
FIG. 3A is a state transition diagram of a conventional Partial Response class-IV (PR4) Viterbi sequence detector.

Operation of the PR4 sequence detector is understood from its state transition diagram shown in FIG. 3A. Each state 100 is represented by the last two input symbols (in NRZ after preceding), and each branch from one state to another is labeled with the current input symbol in NRZ 102 and the corresponding sample value 104 it will produce during readback. Thus, during readback the sample sequence can be demodulated into the input symbol sequence (recorded sequence) according to the state transition diagram. However, noise in the read signal due to timing errors, misequalization, etc., will obfuscate the readback sample values and introduce ambiguity in the correct demodulated data sequence. The function of the sequence detector, then, is to resolve this ambiguity by demodulating the sample values into a most likely data sequence.

Figure 3B:
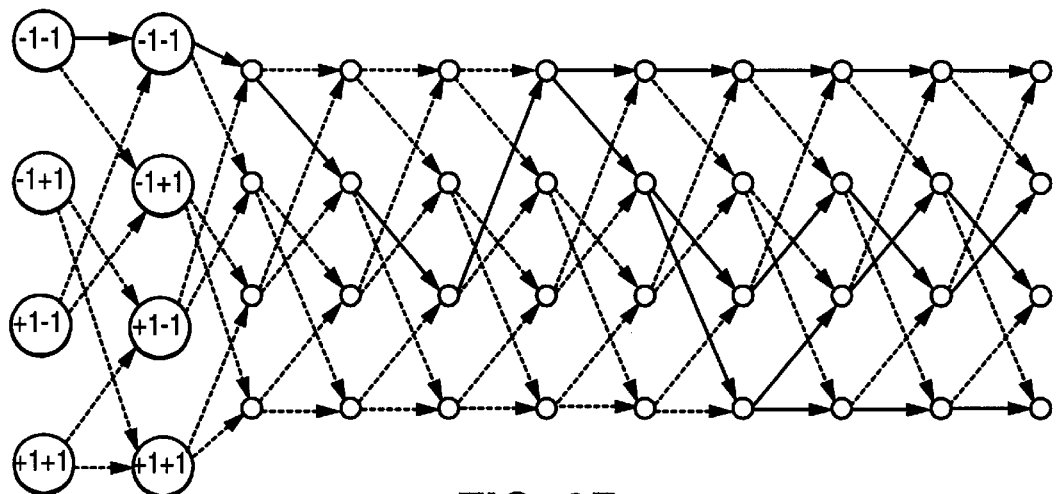
FIG. 3B is a PR4 trellis diagram corresponding to the PR4 state transition diagram of FIG. 3A.

The demodulation process of the sequence detector is understood by representing the state transition diagram of FIG. 3A as a trellis diagram shown in FIG. 3B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values read from the channel. For instance, a Euclidean metric is computed as the accumulated square difference between the expected and actual sample values. The input sequence that generates the smallest Euclidean metric is the most likely sequence to have created the actual sample values; this sequence is therefore selected as the output of the sequence detector.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed (as long as the input sequence is appropriately constrained). In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

The "merging" of path memories is understood from the trellis diagram of FIG. 3B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric. As a result, the paths through the trellis corresponding to the branches not selected will merge into the paths that were selected. Eventually, all of the survivor sequences will merge into one path through the trellis which represents the most likely estimated data sequence to have generated the sample values as shown in FIG. 3B.

Although trellis sequence detection is "maximum likelihood" (or an approximation thereof depending on how the equalizers color the noise), the sequence detector can still make an error in detecting the output sequence if enough destructive noise is present in the read signal. FIG. 4A–4D illustrate the sample error sequences associated with the dominant minimum distance error events of a PR4 sequence detector in NRZ PR4, EPR4 and EEPR4 space, respectfully. In general, a higher order sequence detector will outperform a lower order sequence detector due to the number of data samples the error event affects. Consider, for example, the first error event in the NRZ space shown in FIG. 4A. This error event generates two noise samples which corrupt two data samples (two output bits) in the PR4 space of FIG. 4B, four noise samples in the EPR4 space of FIG. 4C, and four noise samples with two having increased magnitude in the EEPR4 space of FIG. 4D. This "spreading out" of the error event reduces the probability of a detection error. From this observation, it has been determined that the sample errors can be evaluated in a higher order domain to determine when a lower order sequence detector will make an error. This is the essential function of a conventional remod/demod sequence detector: detect a preliminary binary sequence with a lower order trellis sequence detector (e.g., with PR4 Viterbi detector), and evaluate the sample errors in a higher order domain (e.g., in EPR4 domain) to determine when the trellis sequence detector has most likely made an error. In this manner, the amount of circuitry required to implement the trellis sequence detector is reduced while achieving performance gains approaching that of a higher order sequence detector.

The present invention provides yet a further performance enhancement to a conventional remod/demod sequence detector by using a parity channel code to identify when the trellis sequence detector has made a detection error. In effect, the improvement provided by the parity channel code approaches the performance gain provided by matching the trellis state machine of the detector to the parity code constraint using conventional trellis coded modulation (TCM) techniques, but with significantly less circuitry. This aspect of the present invention is disclosed in the following section.

Parity Channel Code for d=1 Remod/Demod Sequence Detector

Figure 5:
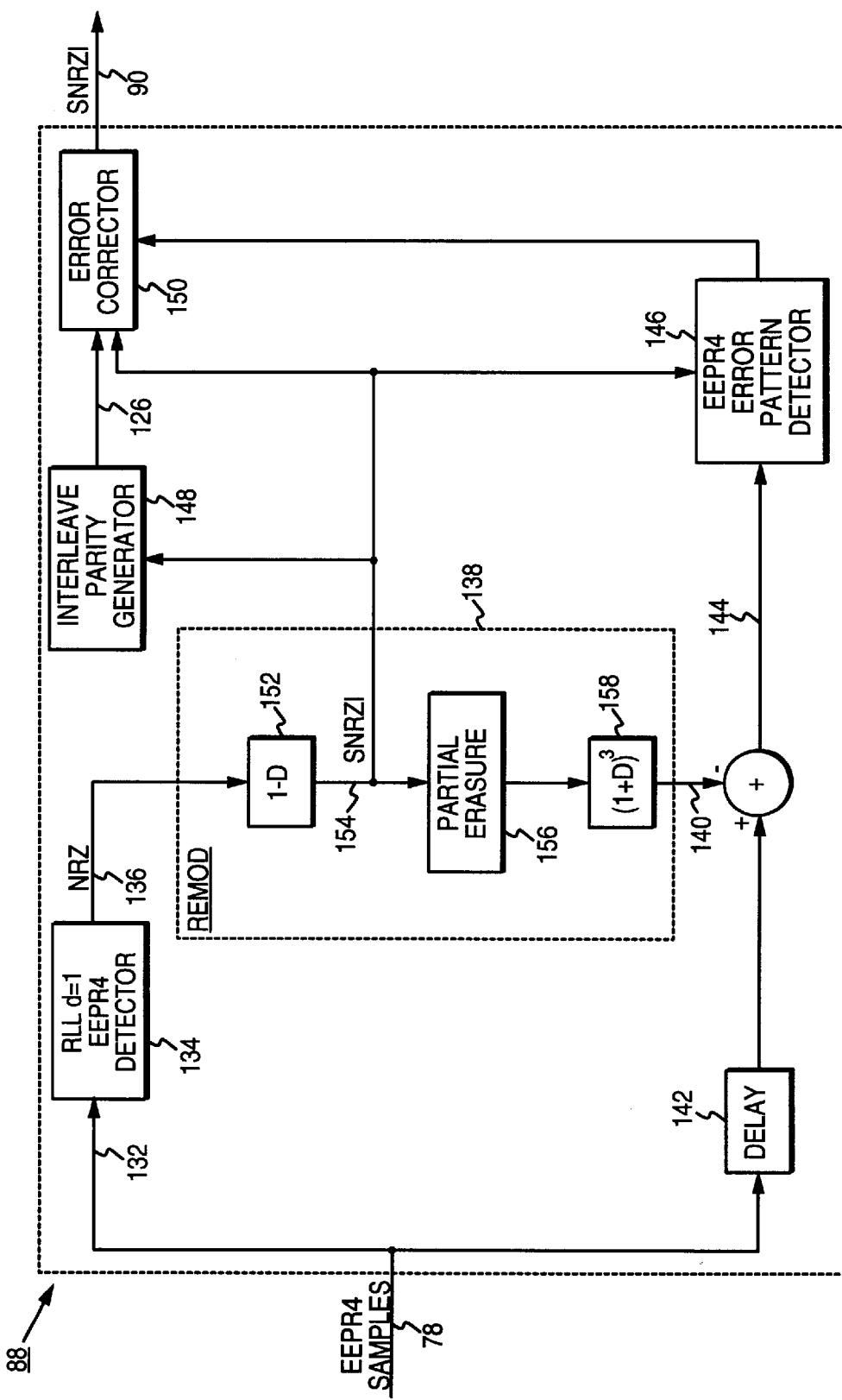
FIG. 5 is a block diagram showing details of the remod/demod sequence detector of FIG. 2, including an EEPR4 sequence detector, a remodulator, an error pattern detector and an error corrector for correcting the detected data sequence when the parity syndrome indicates a detection error has occurred.
Figure 6:
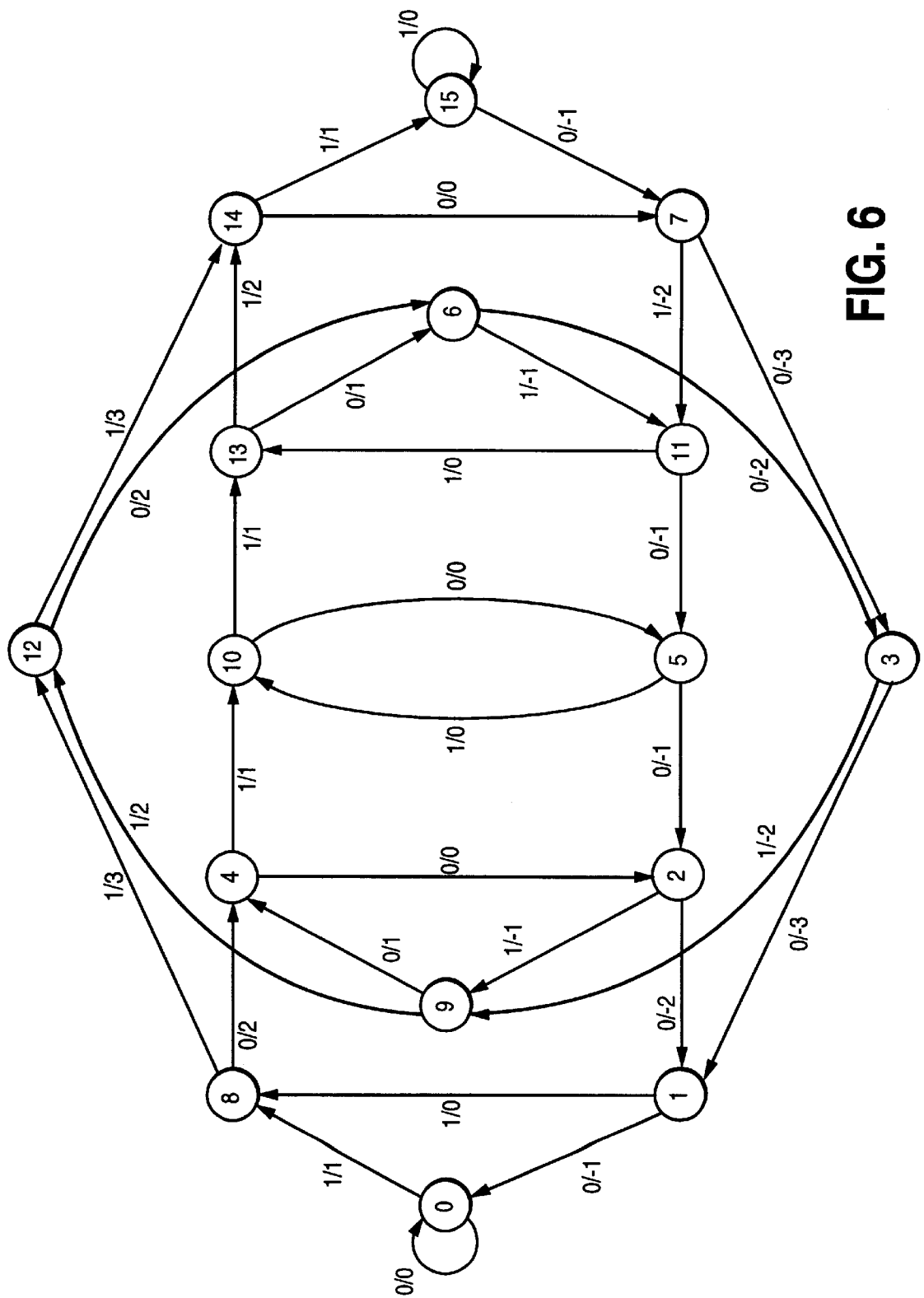
FIG. 6 shows the state transition diagram of a full EEPR4 sequence detector.

FIG. 5 shows a block diagram of the remod/demod sequence detector 88 of FIG. 2. The EEPR4 equalized samples 78 output by the discrete equalizer 74 of FIG. 2 are processed by a conventional EEPR4 trellis sequence detector 134, such as a Viterbi sequence detector, to detect a preliminary binary sequence 136 in NRZ format. The state transition diagram for a full EEPR4 trellis detector, as shown in FIG. 6, comprises sixteen states. A detector of this type is adversely affected by minimum distance error events. However, if the state transition diagram is modified to account for the RLL d=1 constraint in the recorded data, a distance enhancing improvement is achieved because the minimum distance error events are coded out (cannot occur).

Figure 7:
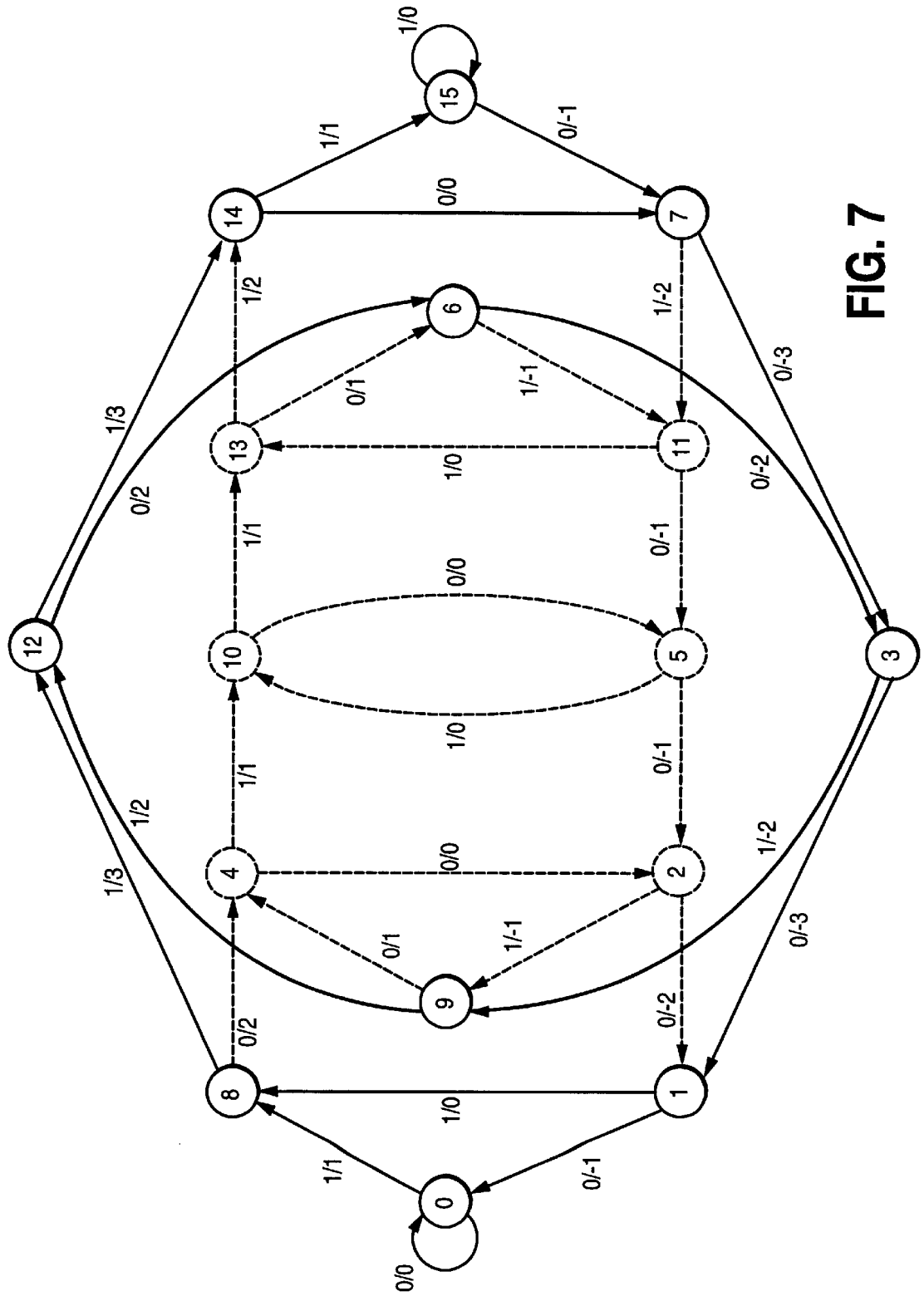
FIG. 7 shows the state transition diagram of an EEPR4 sequence detector matched to an RLL d=1 constraint.

This is understood with reference to FIG. 7 which shows a state transition diagram for an EEPR sequence detector modified or matched to the RLL d=1 constraint. The states and state transitions depicted with dotted lines are deleted since they correspond to a detected data sequence comprising two consecutive NRZI "1" bits which cannot occur due to the d=1 constraint. In effect, the minimum distance error events are coded out of the trellis leaving the single NRZI bit shift error event caused by the first error event shown in FIG. 4D as the most dominant error event. This property of an RLL d=1 EEPR4 detector 134 is exploited by the present invention as described below, therefore it is the preferred embodiment of the present invention. A further reduction in the complexity and cost of the RLL d=1 EEPR4 sequence detector 134 is possible through a technique referred to as "state sharing" which is described in detail in the above referenced U.S. Pat. No. 5,291,499 entitled "Method and Apparatus for Reduced-Complexity Viterbi-Type Sequence Detectors."

The EEPR4 state transition diagram of FIG. 7 generates the detected data sequence 136 output by the EEPR4 sequence detector 134 in NRZ (write current) format. A remodulator 138 remodulates the detected NRZ sequence 136 into an estimated sequence of ideal EEPR4 sample values 140 which are subtracted from the EEPR4 read signal samples 78 (after passing through a delay 142 to account for the delay in the EEPR4 detector 134), thereby generating a sequence of sample error values 144. An EEPR4 error pattern detector 146 processes the sequence of sample errors 144 to detect when the RLL d=1 EEPR4 sequence detector 134 most likely made an error. The error pattern detector 144 comprises a finite-impulse-response (FIR) filter matched to the minimum distance error event (i.e., matched to a bit shift error event). In prior remod/demod sequence detectors, an error in the detected SNRZI (signed NRZI) sequence 154 is corrected by an error corrector 150 when the output of the FIR filter exceeds a predetermined threshold and the detected SNRZI sequence 154 is consistent with the detected error event. However, the detected SNRZI sequence 154 can be miscorrected if the error event exceeds the predetermined threshold when in fact no detection error occurred.

To decrease the probability of miscorrections, the present invention employs a parity channel code capable of detecting when an error occurs in a predetermined number of bits (i.e., a block) of the detected binary sequence. As described above, two parity bits are generated during a write operation by computing the parity over the even or odd interleave of a block of the recorded data in the NRZI domain. Parity is generated over one interleave of the data because the minimum distance error event, a bit shift error event, will change the parity in either interleave. The two parity bits output by the parity generator 44 are appended to the data to form a parity codeword written to the disk. Upon read back, an interleave parity generator 148 shown in FIG. 5 processes the detected SNRZI sequence 154 output by the EEPR4 sequence detector 134 to generate a parity error syndrome 126 which indicates when a detection error occurred in the parity code word.

When the parity error syndrome 126 indicates that the detected parity code word contains an error, an error corrector 150 corrects the detected SNRZI sequence 154 using the error event detected by the error pattern detector 146 most likely to have caused the error (e.g., the maximum error event over the parity codeword). In this manner, the probability of a miscorrection decreases because the parity error syndrome only allows a correction to occur when an error is present.

Figure 8:
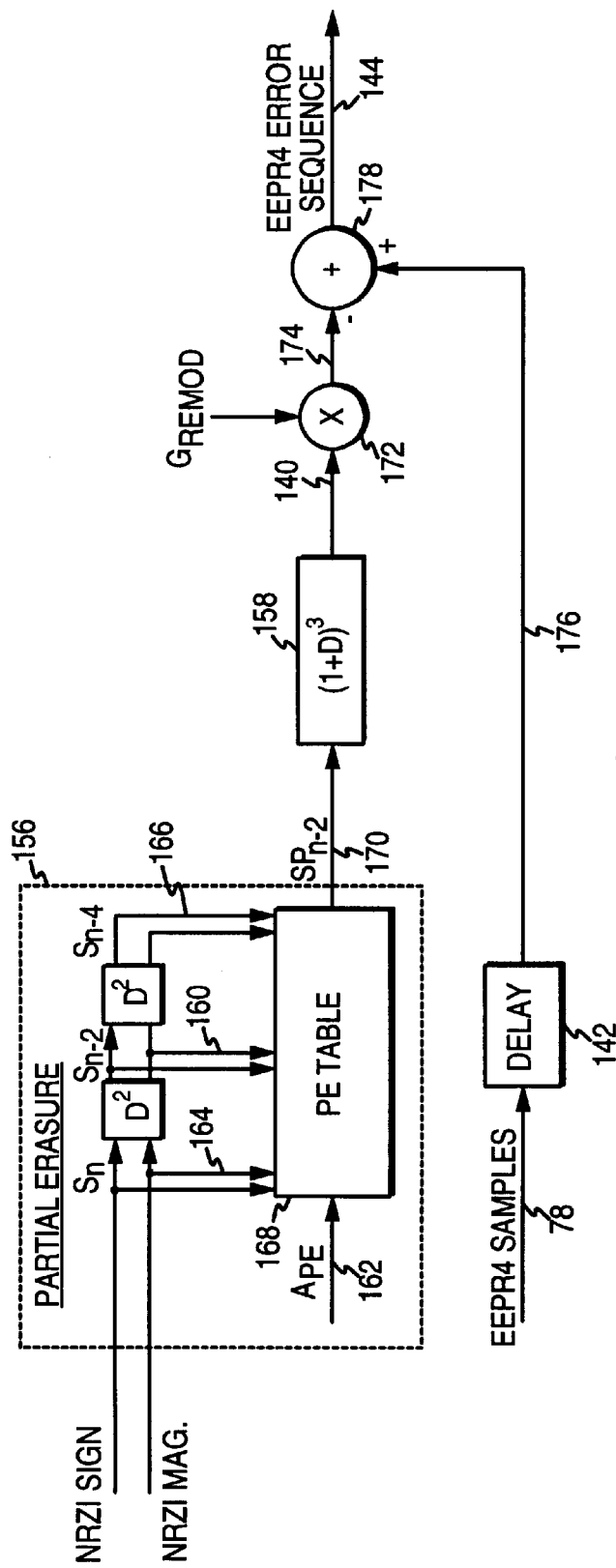
FIG. 8 shows more details of the remodulator in the remod/demod sequence detector of FIG. 2.

The remodulator 138 of FIG. 5 comprises a 1−D filter 152 for converting the detected NRZ sequence 136 into a signed NRZI (SNRZI) sequence 154, a partial erasure compensator 156 which adjusts the magnitude of the SNRZI sequence 154 to account for the effect of partial erasure, and a (1+D)³ filter 158 for converting the output of the partial erasure compensator 156 into a sequence of estimated EEPR4 sample values 140. A more detailed block diagram of the remodulator 138 of FIG. 5 is shown in FIG. 8.

The RLL d=1 constraint attenuates the deleterious effect of partial erasure, the non-linear reduction in pulse amplitude caused by adjacent flux transitions, by increasing the physical distance between consecutive flux transitions. However, at extremely high data densities the partial erasure phenomenon can still occur. Therefore, the present invention provides an optional partial erasure compensator 156 for adjusting the magnitude of the SNRZI samples to account for the partial erasure that can occur at extremely high data densities. The magnitude of the SNRZI sample at $S_{n-2}$ 160 is reduced by $A_{PE}$ 162 (where $A_{PE}$<1) if there is an adjacent transition either at $S_n$ 164 or at $S_{n-4}$ 166, and the magnitude of $S_{n-2}$ 160 is reduced by ($A_{PE}+A_{PE}$) if there is an adjacent transition both at $S_n$ 164 and at $S_{n-4}$ 166. To implement the partial erasure compensator 156, the SNRZI samples, designated $S_n$, $S_{n-2}$ and $S_{n-4}$, index a lookup table 168 which outputs a modified value for $S_{n-2}$ (designated $SP_{n-2}$ 170) in accordance with the entries shown in Table 3.

TABLE 3

| SNRZI | | | MODIFIED SNRZI | SNRZI | | | MODIFIED SNRZI |
| --- | --- | --- | --- | --- | --- | --- | --- |
| $S_{n-4}$ | $S_{n-2}$ | $S_n$ | $SP_{n-2}$ | $S_{n-4}$ | $S_{n-2}$ | $S_n$ | $SP_{n-2}$ |
| 0 | +1 | 0 | +1 | 0 | −1 | 0 | −1 |
| −1 | +1 | 0 | +1 − $A_{PE}$ | +1 | −1 | 0 | −1 + $A_{PE}$ |
| 0 | +1 | −1 | +1 − $A_{PE}$ | 0 | −1 | +1 | −1 + $A_{PE}$ |
| −1 | +1 | −1 | +1 − ($A_{PE}$ + $A_{PE}$) | +1 | −1 | +1 | −1 + ($A_{PE}$ + $A_{PE}$) |

After compensating for the effect of partial erasure, the modified SNRZI samples $SP_{n-2}$ 170 pass through a $(1+D)^3$ filter 158, thereby converting the SNRZI samples into an estimated EEPR4 sample sequence 140. Because the gain control 80 of FIG. 2 attempts to compensate for the non-linear effect of partial erasure by adjusting the read signal amplitude toward an ideal EEPR4 magnitude on average, a gain multiplier 172 adjusts the magnitude of the remodulated EEPR4 sequence 140 to compensate for this adjustment. The estimated EEPR4 sample sequence 174 at the output of the gain multiplier 172 is then subtracted from the actual read signal EEPR4 sample values 176 at adder 178 to generate an EEPR4 sample error sequence 144.

Figure 4A:
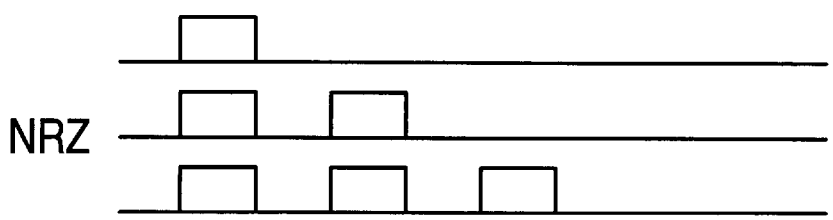
FIGS. 4A–4D show the dominant minimum distance error events of a PR4 sequence detector in NRZ, PR4, EPR4 and EEPR4 space, respectively.
Figure 4B:
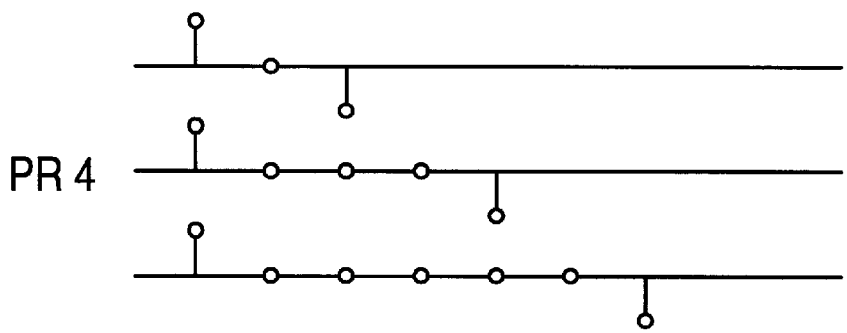
Figure 4C:
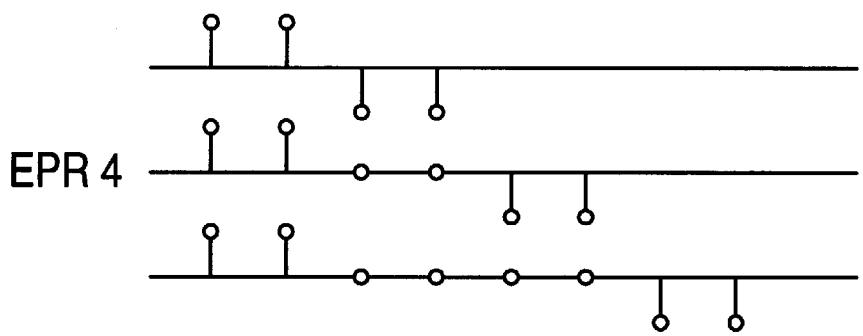
Figure 4D:
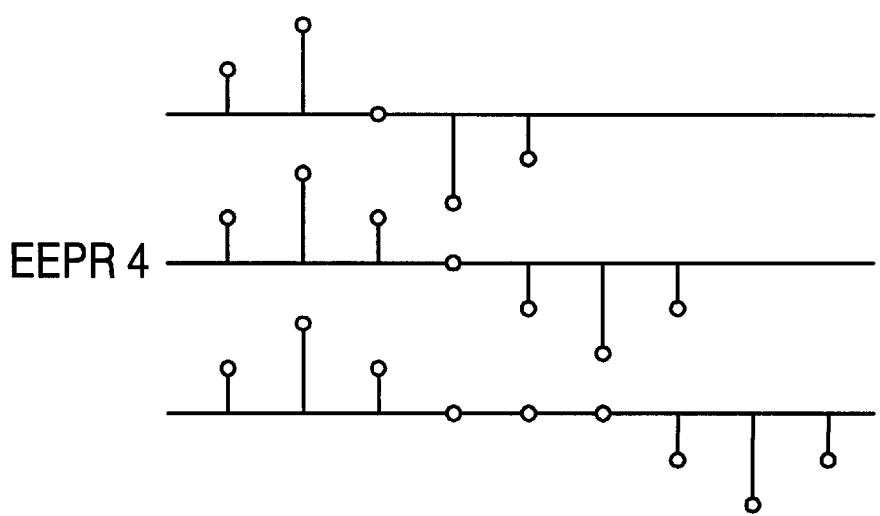
Figure 9:
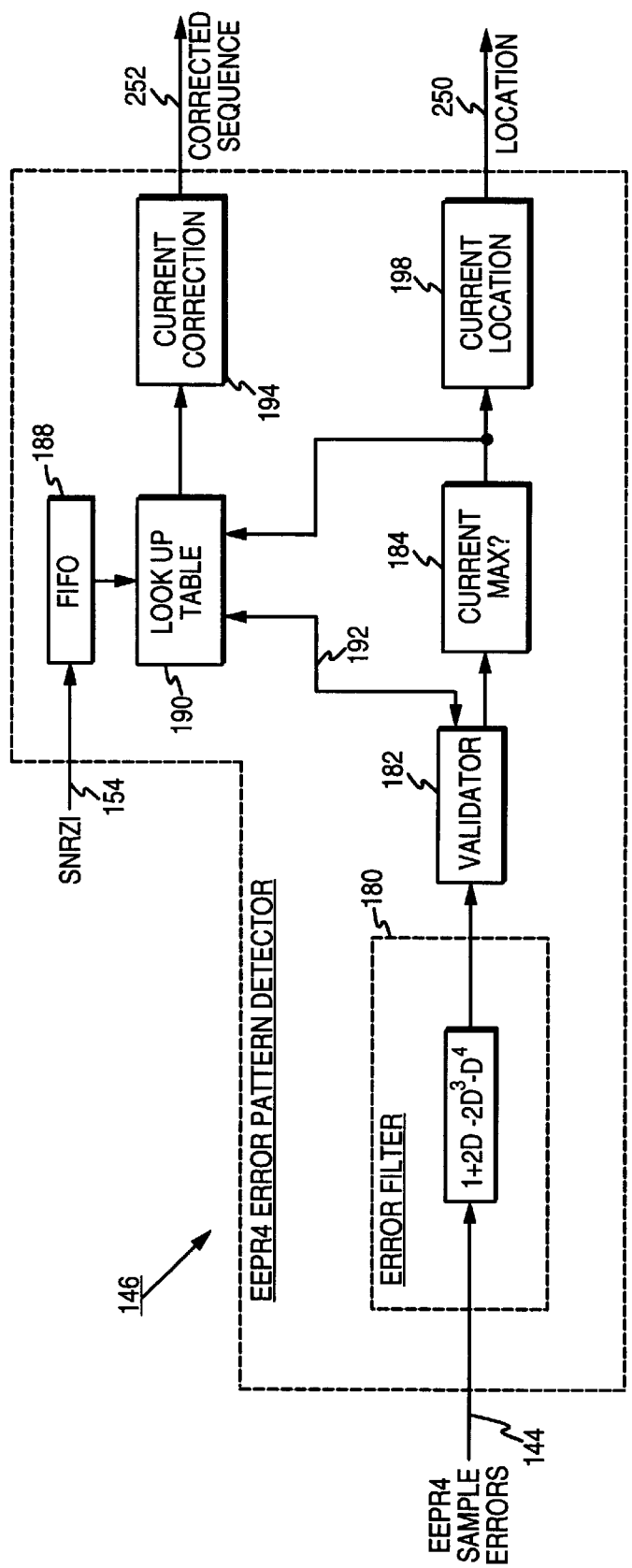
FIG. 9 is a block diagram of the error pattern detector in the remod/demod sequence detector of FIG. 2.

The sample error sequence 144 is then processed by the EERP4 error pattern detector 146 of FIG. 5, a more detailed diagram of which is provided in FIG. 9. As described above, due to the RLL d=1 constraint the minimum distance error events are coded out leaving the bit shift error caused by the first error event shown in FIG. 4D as the most dominant error event. Therefore, the EEPR4 error pattern detector 146 of the present invention comprises a single FIR filter 180 of the form:

$$1+2D-2D^3-D^4$$

which generates an impulse response matched to the first error event shown in FIG. 4D.

For each error sample input into the error pattern detector, a validator 182 uses the output of the FIR filter 180 to index a look up table 190 for determining whether the current error event corresponds to a valid error sequence as described below. If the error event corresponds to a valid error sequence, then the output of the FIR filter 180 is compared to a "current maximum" at comparator 184. The "current maximum" saves the maximum FIR output over the current parity code word being processed. If the error event is greater than the current maximum, then the error location 198 and corresponding correction sequence 194 are saved. At the end of the parity codeword, the error location 198 and correction sequence 194 corresponding to the maximum error event are used to correct the codeword if the parity error syndrome indicates a detection error occurred.

The SNRZI sequence 154 generated by the remodulator 138 is buffered in a FIFO buffer 188 and compared to expected error sequences stored in the lookup table 190. As each new sample value is processed, the output of the error filter 180 indexes the lookup table 190 over line 192 to determine whether the detected SNRZI sequence 154 matches a valid error sequence. The validator 182 will only compare the output of the FIR error filter 180 to the current maximum if the current error event corresponds to a valid error sequence. When a valid potential error event is detected (i.e., when the output of the FIR error filter 180 exceeds the current maximum and the detected SNRZI sequence corresponds to a valid error sequence), the lookup table 190 outputs a correction sequence corresponding to the detected error for the current parity code word, and the correction sequence is saved in register 194.

The lookup table 190 of FIG. 9 operates according to Table 4 below which shows the expected SNRZI sequences that would be detected if corrupted by the minimum distance bit shift error event E1 (first error event of FIG. 4D), and the corresponding corrected output sequences.

the error location, and the lookup table 190 of FIG. 9 determines the correction value. At step 228 the COUNTER is incremented to process the next bit of the parity codeword (and the next read signal EEPR4 sample).

After processing the last bit of the current parity codeword (i.e., COUNTER equals N at step 206), then at step 232 the parity error syndrome is evaluated. If not zero, indicating a detection error occurred, then at step 234 the detected SNRZI sequence 154 is corrected using the saved correction value ERR_CORR at the error location ERR_LOC. Thereafter at step 236, the COUNTER, PARITY and CUR_MAX are cleared before processing the next parity codeword. The above procedure is re-iterated until the end of the current data sector is reached at step 238.

Figure 11:
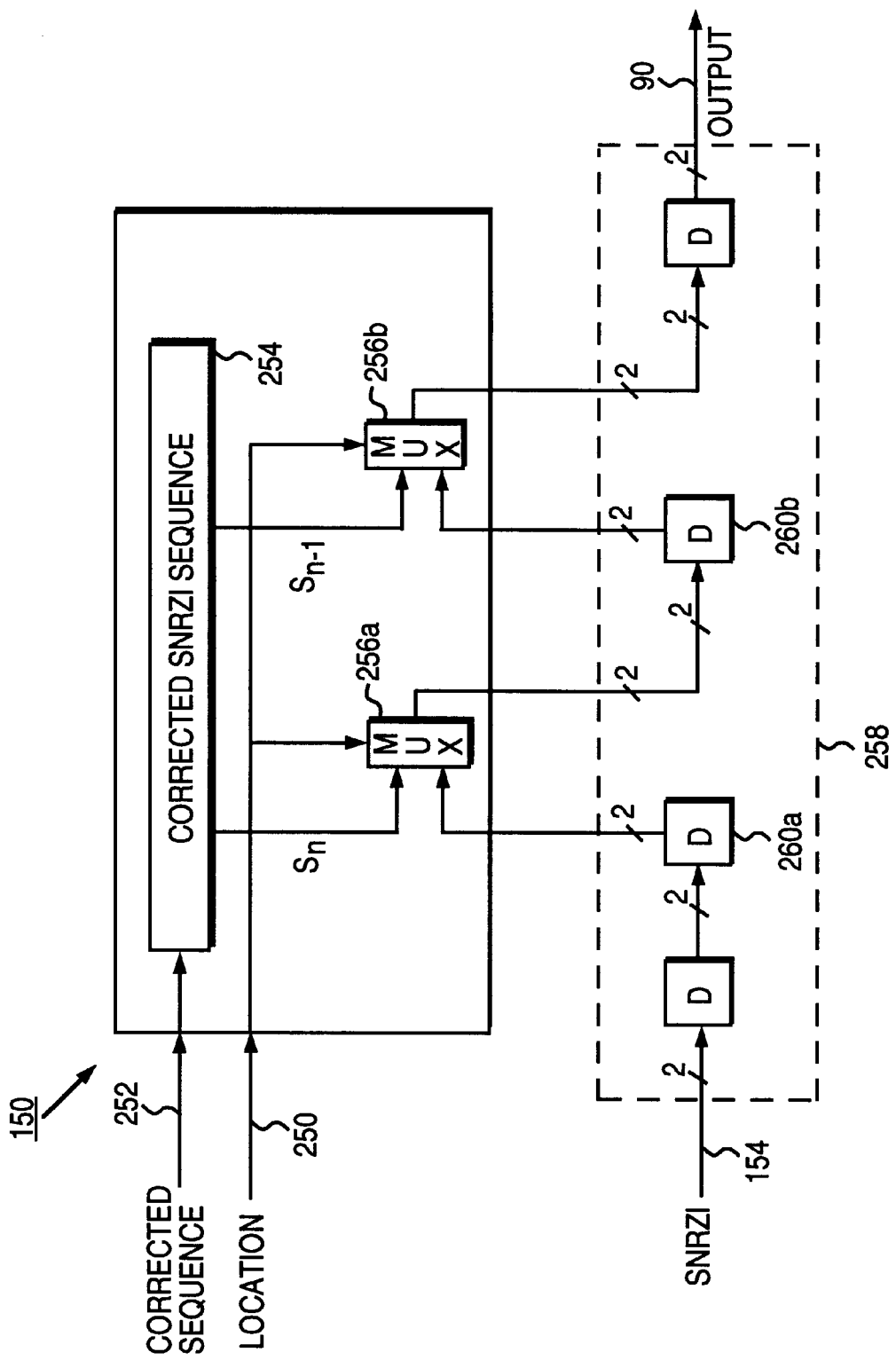
FIG. 11 is a block diagram of the error corrector in the remod/demod sequence detector of FIG. 2.

A better understanding of how the error corrector 150 of FIG. 5 corrects an error in the detected SNRZI sequence 154 is understood with reference to the block diagram of FIG. 11. When the parity error syndrome 126 generated by the syndrome generator 148 indicates a detection error occurred in the current parity code word, the error corrector 150 receives from the EEEPR4 error pattern detector 146 of FIG. 9 the location of the maximum error event over line 250 and the corresponding corrected SNRZI sequence over line 252. The corrected SNRZI sequence is stored in register 254 and

TABLE 4

SNRZI Error (+1, −1)

| E1 | Expected SNRZI | | | Corrected SNRZI | | | E1 | Expected SNRZI | | | Corrected SNRZI | | |
| --- | --- | --- | --- | --- | --- | --- | --- | --- | --- | --- | --- | --- | --- |
|  | $S_n$ | $S_{n-1}$ | $S_{n-2}$ | $S_n$ | $S_{n-1}$ | $S_{n-2}$ |  | $S_n$ | $S_{n-1}$ | $S_{n-2}$ | $S_n$ | $S_{n-1}$ | $S_{n-2}$ |
| E1 < 0 | −0 | −0 | −1 | −0 | −1 | +0 | E1 > 0 | +0 | +0 | +1 | +0 | +1 | −0 |
| E1 < 0 | +1 | −0 | −0 | +0 | +1 | −0 | E1 > 0 | −1 | +0 | +0 | −0 | −1 | +0 |

The error event E1 can be positive or negative depending on the polarity of the sample error sequence 144. The detected SNRZI sequences stored in the FIFO buffer 188 of FIG. 9 are compared to the "Expected SNRZI" sequences in the above lookup table to determine whether a valid correction can be made.

Figure 10:
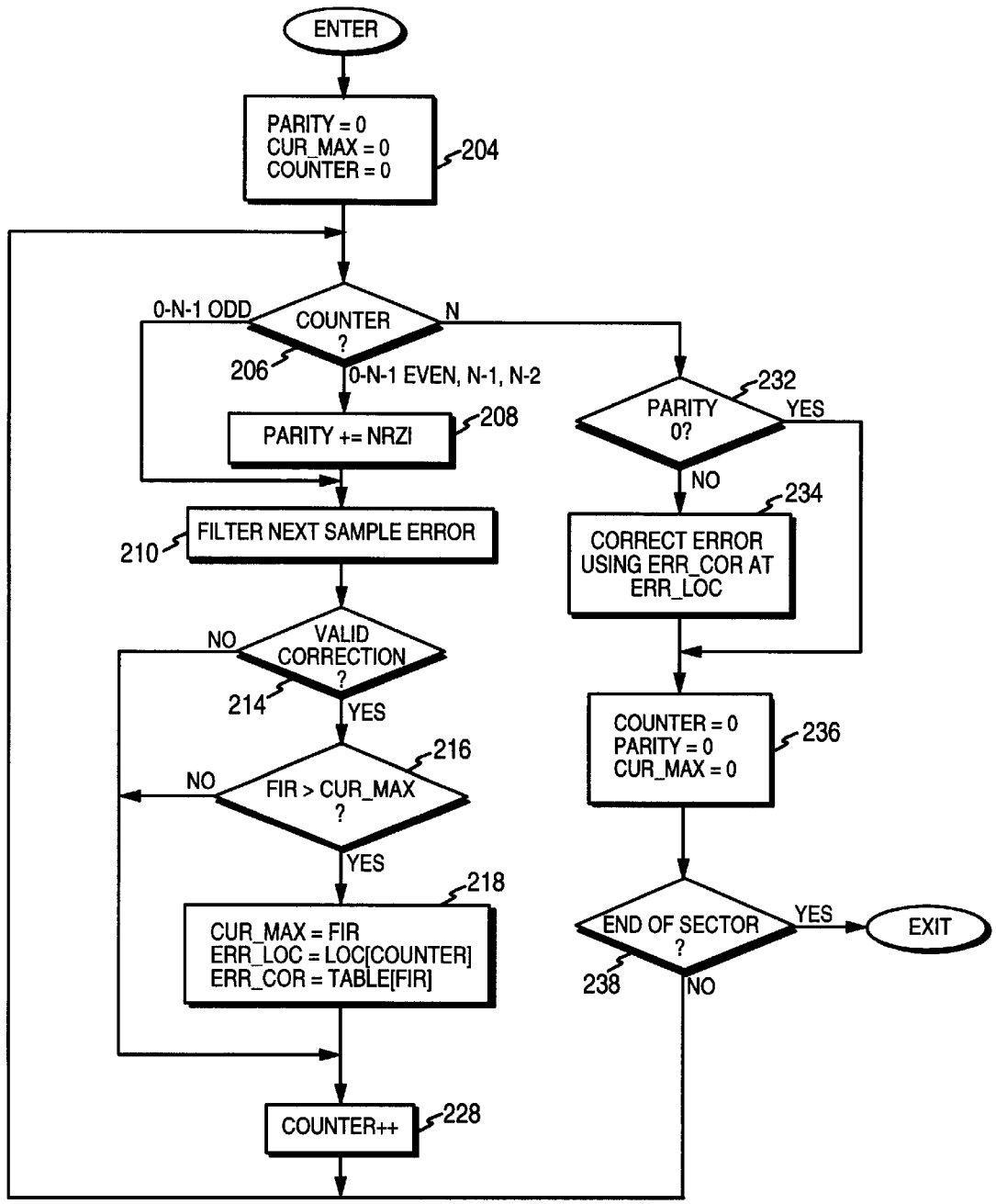
FIG. 10 is a flow chart that illustrates the operation of the parity generation and error correction process of the present invention.

A flow diagram illustrating the operation of the remod/demod sequence detector and parity channel code of the present invention is shown in FIG. 10. At the beginning of a read operation certain variables are cleared at step 204: a PARITY error syndrome which tracks the parity over one interleave of the current parity codeword, a CUR_MAX which stores the current maximum error event, and a COUNTER which tracks the current bit of the parity codeword being processed. At step 206, a branch is executed based on the current value of the COUNTER. If the COUNTER is 0-N-1 EVEN, N-1 or N-2, where N is the number of bits in a parity codeword, then the PARITY error syndrome is updated at step 208 by adding (XORing) the current detected NRZI bit. The N-1 and N-2 counter values represent the parity bits which are both added into the PARITY error syndrome. Then at step 210 the next read signal EEPR4 sample error is filtered by the FIR error filter 180 of FIG. 9. At step 214, the validator 182 of FIG. 9 determines whether the detected SNRZI sequence corresponds to a valid error event stored in table 190. If yes, then at step 216 the output of the FIR error filter 180 is compared to the current maximum. If greater, then at step 218 the CUR_MAX is updated with the output of the FIR error filter, and the error location ERR_LOC and correction value ERR_COR are updated. The COUNTER value determines applied to a first input of multiplexers 256a and 256b. The detected SNRZI sequence 154 is shifted through a shift register 258, wherein the output of delay elements 260a and 260b are applied to a second input of multiplexers 256a and 256b. The location of the maximum error event, LOCATION 250, controls the operation of the multiplexers 256a and 256b in order to replace the erroneous bits in the detected SNRZI sequence with the corrected SNRZI sequence at the appropriate time. The output lines of register 254 labeled $S_n$ and $S_{n-1}$ correspond to the corrected SNRZI sequences shown in Table 4 discussed above.

The objects of the invention have been fully realized through the embodiments disclosed herein. Those skilled in the art will appreciate that the various aspects of the invention can be achieved through different embodiments without departing from the essential function. For example, those skilled in the art will appreciate that code constraints other than parity could be employed to detect when the trellis detector has made a detection error. Furthermore, the aspects of the present invention could be used to detect bit shift error events in channel codes other than RLL d=1. The particular embodiments disclosed are illustrative and not meant to limit the scope of the invention as appropriately construed from the following claims.

I claim:

1. A sampled amplitude read channel for reading data recorded on a disk storage medium by detecting the data from a sequence of discrete-time sample values generated by sampling pulses in an analog read signal from a read head positioned over the disk storage medium, comprising:
   (a) a sampling device for sampling the analog read signal to generate the discrete-time sample values; and (b) a discrete time sequence detector for detecting a preliminary sequence from the discrete-time sample values, comprising an interleave parity generator for computing a parity syndrome over one interleave of the preliminary sequence, the parity syndrome for correcting errors in the preliminary sequence.

2. The sampled amplitude read channel as recited in claim 1, further comprising a write parity generator for generating a parity bit appended to the data before recording the data to the disk storage medium, wherein the interleave parity generator uses the parity bit during a read operation to generate the parity syndrome.

3. The sampled amplitude read channel as recited in claim 1, wherein the preliminary sequence is in an NRZI format.

4. The sampled amplitude read channel as recited in claim 1, wherein the preliminary sequence comprises a run-length-limited (RLL) d=1 constraint.

5. The sampled amplitude read channel as recited in claim 4, wherein:
 (a) the preliminary sequence comprises a plurality of codewords;
 (b) each codeword comprises a data field and a two bit parity field; and
 (c) the two bit parity field takes on a value selected from the group consisting of 00, 01, and 10 such that:
  (i) the modulo-2 division of the data field added to the parity field is a predetermined value; and
  (ii) the RLL d=1 constraint is maintained.

6. The sampled amplitude read channel as recited in claim 1, wherein the discrete-time sequence detector further comprises:
 (a) a remodulator for remodulating the preliminary sequence into an estimated sample sequence; and
 (b) a sample error generator, responsive to the discrete-time sample values and the estimated sample sequence, for generating a sample error sequence.

7. The sampled amplitude read channel as recited in claim 6, wherein the discrete-time sequence detector further comprises an error pattern detector for detecting an error event in the sample error sequence.

8. The sampled amplitude read channel as recited in claim 7, wherein the error pattern detector comprises a plurality of FIR filters matched to minimum distance error events of the discrete-time sequence detector.

9. The sampled amplitude read channel as recited in claim 7, wherein:
 (c) the error pattern detector generates a correction sequence and location for an error in the preliminary sequence; and
 (d) the discrete-time sequence detector further comprises an error corrector for correcting the preliminary sequence using the correction sequence and location of the errors.

10. The sampled amplitude read channel as recited in claim 1, wherein the discrete-time sequence detector further comprises an error detection validator for checking the validity of a detected error event.

11. The sampled amplitude read channel as recited in claim 1, wherein the discrete-time sequence detector further comprises an error corrector for correcting an error in the preliminary sequence when the parity syndrome indicates that the preliminary sequence contains an error.

12. The sampled amplitude read channel as recited in claim 1, wherein the discrete-time sequence detector further comprises:
 (e) an error pattern detector for detecting an error event in the sample error sequence, the error pattern detector generates a correction sequence and location for an error in the preliminary sequence; and
 (f) an error corrector for correcting the preliminary sequence using the correction sequence and location of the errors.

13. The sampled amplitude read channel as recited in claim 12, further comprising a data buffer for buffering a predetermined number of bits in the preliminary sequence, wherein:
 (g) the error pattern detector detects a plurality of potential error events within the preliminary sequence buffered in the data buffer; and
 (h) the error pattern detector evaluates the error events to determine the error event most likely to have actually caused an error in the preliminary sequence.

14. The sampled amplitude read channel as recited in claim 1, further comprising:
 (i) an input connected to receive the data to be written to the disk storage medium;
 (j) a data encoder for encoding n bits of the data into m-bit code words according to a code constraint; and
 (k) a write parity generator for generating at least one parity bit appended to the code words before recording the code words to the disk storage medium, wherein the interleave parity generator uses the parity bit during a read operation to generate the parity syndrome.

15. The sampled amplitude read channel as recited in claim 14, wherein the code constraint is a run-length-limited (RLL) d=1 code constraint.

16. A sampled amplitude read channel for reading run-length-limited (RLL) d=1 data recorded on a disk storage medium by detecting the data from a sequence of discrete-time sample values generated by sampling pulses in an analog read signal from a read head positioned over the disk storage medium, comprising:
 (l) a sampling device for sampling the analog read signal to generate the discrete-time sample values;
 (m) a timing recovery circuit, responsive to the discrete-time sample values, for generating synchronous sample values substantially synchronized to a baud rate of the recorded data; and
 (n) a remod/demod sequence detector for detecting the data from the synchronous sample values, comprising:
  (i) a discrete time sequence detector, responsive to the synchronous sample values, for detecting a preliminary sequence in an NRZI format, the preliminary sequence having one or more errors;
  (ii) an interleave parity generator for generating a parity syndrome over one interleave of the preliminary sequence;
  (iii) a remodulator for remodulating the preliminary sequence into a sequence of estimated sample values;
  (iv) an error value generator, responsive to the synchronous sample values and the estimated sample values, for generating a sequence of sample error values;
  (v) an error pattern detector, responsive to the sequence of sample error values, for detecting a magnitude and location of the errors in the preliminary sequence; and
  (vi) an error corrector, responsive to the magnitude and location of the errors and to the parity syndrome, for correcting the preliminary sequence.

17. The sampled amplitude read channel as recited in claim 16, further comprising a write parity generator for generating at least one parity bit appended to the data before recording the data to the disk storage medium, wherein the interleave parity generator uses the parity bit during a read operation to generate the parity syndrome.

18. The sampled amplitude read channel as recited in claim 16, wherein the error corrector corrects an error in the preliminary sequence when the parity syndrome indicates that the preliminary sequence contains an error.

19. The sampled amplitude read channel as recited in claim 18, further comprising a data buffer for buffering a predetermined number of bits in the preliminary sequence, wherein:
  (a) the error pattern detector detects a plurality of potential error events within the preliminary sequence buffered in the data buffer; and
  (b) the error pattern detector evaluates the error events to determine the error event most likely to have actually caused an error in the preliminary sequence.

20. The sampled amplitude read channel as recited in claim 16, wherein:
  (c) the preliminary sequence comprises a plurality of codewords;
  (d) each codeword comprises a data field and a two bit parity field; and
  (e) the two bit parity field takes on a value selected from the group consisting of 00, 01, and 10 such that:
    (i) the modulo-2 division of the data field added to the parity field is a predetermined value; and
    (ii) the RLL d=1 constraint is maintained.

21. A sampled amplitude read channel for reading run-length-limited (RLL) d=1 data from a disk storage medium by detecting the data from a sequence of discrete-time sample values generated by sampling pulses in an analog read signal from a read head positioned over the disk storage medium, comprising:
  (a) a sampling device for sampling the analog read signal to generate the discrete-time sample values;
  (b) a discrete-time sequence detector for detecting a preliminary sequence from the discrete-time sample values, wherein the preliminary sequence is in an NRZI format;
  (c) an interleave parity generator for generating a parity syndrome over one interleave of the preliminary sequence;
  (d) an error pattern detector, responsive to the discrete-time sample values, for detecting an error event in the preliminary sequence; and
  (e) an error corrector, responsive to the error pattern detector and to the parity syndrome, for correcting errors in the preliminary sequence.

22. The sampled amplitude read channel as recited in claim 21, further comprising:
  (f) a remodulator for remodulating the preliminary sequence into a sequence of estimated sample values; and
  (g) a sample error generator, responsive to the discrete-time sample values and the estimated sample values, for generating a sample error sequence.

23. The sampled amplitude read channel as recited in claim 22, wherein the error pattern detector detects the error event using the sample error sequence.

24. The sampled amplitude read channel as recited in claim 23, wherein the error pattern detector comprises a plurality of FIR filters matched to minimum distance error events of the discrete-time sequence detector.

25. The sampled amplitude read channel as recited in claim 21, wherein:
  (h) the preliminary sequence comprises a plurality of codewords;
  (i) each codeword comprises a data field and a two bit parity field; and
  (j) the two bit parity field takes on a value selected from the group consisting of 00, 01, and 10 such that:
    (i) the modulo-2 division of the data field added to the parity field is a predetermined value; and
    (ii) the RLL d=1 constraint is maintained.

* * * * *